(12) United States Patent
Lin et al.

(10) Patent No.: US 7,923,414 B2
(45) Date of Patent: Apr. 12, 2011

(54) RHEOLOGY MODIFIER COMPRISING A TETRAKIS(HYDROXYALKYL) PHOSPHONIUM SALT FOR POLYMER FLUIDS

(75) Inventors: Lijun Lin, Sugar Land, TX (US); Leiming Li, Sugar Land, TX (US); Mathew M. Samuel, Sugar Land, TX (US); Syed Ali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/534,901

(22) Filed: Aug. 4, 2009

(65) Prior Publication Data
US 2011/0034352 A1    Feb. 10, 2011

(51) Int. Cl.
*C09K 8/22* (2006.01)
*E21B 43/00* (2006.01)

(52) U.S. Cl. ........ 507/128; 507/110; 507/117; 507/209; 507/213; 507/219; 507/237; 507/904

(58) Field of Classification Search .......... 507/128, 507/110, 117, 209, 211, 213, 219, 237, 904
See application file for complete search history.

(56) References Cited

U.S. PATENT DOCUMENTS

| | | | |
|---|---|---|---|
| 2003/0092584 A1* | 5/2003 | Crews | 507/200 |
| 2005/0261138 A1 | 11/2005 | Robb et al. | |
| 2006/0243449 A1 | 11/2006 | Welton et al. | |
| 2006/0247135 A1 | 11/2006 | Welton et al. | |
| 2008/0190609 A1 | 8/2008 | Robb et al. | |
| 2008/0194427 A1 | 8/2008 | Welton et al. | |
| 2008/0194428 A1 | 8/2008 | Welton et al. | |
| 2008/0194430 A1 | 8/2008 | Welton et al. | |
| 2008/0287323 A1* | 11/2008 | Li et al. | 507/211 |
| 2008/0305971 A1 | 12/2008 | Li et al. | |
| 2009/0023613 A1 | 1/2009 | Li et al. | |

\* cited by examiner

*Primary Examiner* — Timothy J. Kugel
(74) *Attorney, Agent, or Firm* — Rachel Greene; David Cate; Robin Nava

(57) ABSTRACT

Embodiments of this invention relate to a composition and a method for tailoring the rheology of a fluid for use in the oil field services industry including forming a fluid comprising a tetrakis(hydroxyalkyl) phosphonium salt and a polymer, and exposing the fluid to a temperature of about 20° C. to about 200° C., wherein a viscosity is observed that is at least about 5 percent different than if no salt were present. Embodiments of this invention also relate to a composition and a method for tailoring the rheology of a fluid for use in the oil field services industry including forming a fluid comprising a tetrakis(hydroxyalkyl) phosphonium salt and diutan and/or guar and/or guar derivatives and/or a combination thereof, and exposing the fluid to a temperature of about 20° C. to about 163° C., wherein a viscosity is observed that is at least about 5 percent lower than if no salt were present. Embodiments of this invention also relate to a composition and a method for tailoring the rheology of a fluid for use in the oil field services industry including forming a fluid comprising a tetrakis(hydroxyalkyl) phosphonium salt and xanthan, and exposing the fluid to a temperature of about 20° C. to about 200° C., wherein a viscosity is observed that is at least about 5 percent higher than if no salt were present.

22 Claims, 6 Drawing Sheets

RHEOLOGY MODIFIER COMPRISING A TETRAKIS(HYDROXYALKYL) PHOSPHONIUM SALT FOR POLYMER FLUIDS

BACKGROUND

1. Field

This invention relates to fluids for use in the oil field services industry. In particular, the invention relates to methods and compositions for using polymer based fluids.

2. Description of the Related Art

Naturally occurring polymers such as guar, diutan, and xantham are used in a variety of oilfield services well treatment fluids. For example, diutan gum often is used as a gelling agent in wellbore cleanout and for high temperature foamed fluids. Compared to other polysaccharides, diutan can withstand higher temperatures as a linear gel, making it particularly useful for high temperature applications. Guar and/or xanthan and/or derivatives thereof may also be selected for use in oil field service fluids over a variety of temperature or pressure ranges depending on the derivatives, additives, pre-treatment regimes, or pH of the fluid.

In some applications, crosslinked polymers may be desirable. In other applications, stabilized polymers may be desirable. In any event, a well treatment fluid that uses polymers in combination with a low cost, environmentally friendly stabilizer and/or breaker is desirable.

SUMMARY

Embodiments of this invention relate to a composition and a method for tailoring the rheology of a fluid for use in the oil field services industry including forming a fluid comprising a tetrakis(hydroxyalkyl) phosphonium salt and a polymer, and exposing the fluid to a temperature of about 20° C. to about 200° C., wherein a viscosity is observed that is at least about 5 percent different than if no salt were present. Embodiments of this invention also relate to a composition and a method for tailoring the rheology of a fluid for use in the oil field services industry including forming a fluid comprising a tetrakis(hydroxyalkyl) phosphonium salt and diutan and/or guar and/or guar derivatives and/or a combination thereof, and exposing the fluid to a temperature of about 20° C. to about 200° C., wherein a viscosity is observed that is at least about 5 percent lower than if no salt were present. Embodiments of this invention also relate to a composition and a method for tailoring the rheology of a fluid for use in the oil field services industry including forming a fluid comprising a tetrakis(hydroxyalkyl) phosphonium salt and xanthan, and exposing the fluid to a temperature of about 20° C. to about 200° C., wherein a viscosity is observed that is at least about 5 percent higher than if no salt were present.

DESCRIPTION

Figure 1:
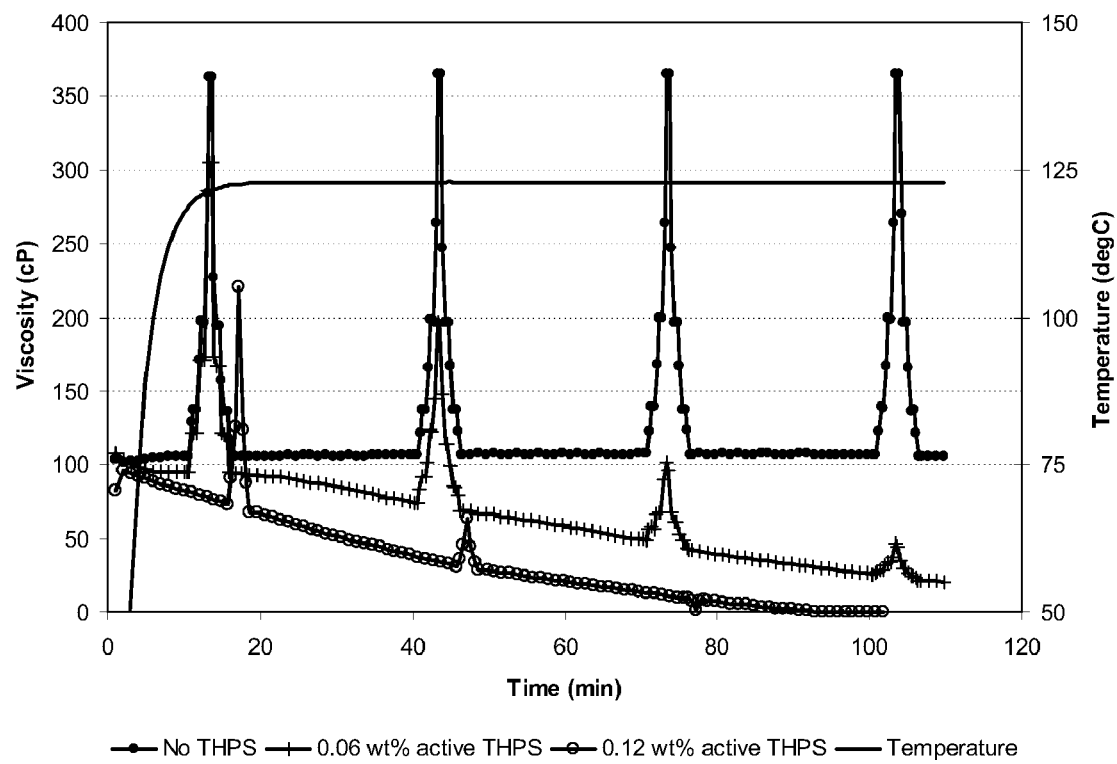
FIG. 1 is a plot of viscosity as a function of time at 121° C. for fluids containing 0.48 weight percent of diutan gum, 2 weight percent KCl, and various amounts of THPS.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

This invention relates to the use of tetrakis(hydroxyalkyl) phosphonium salts for breaking diutan and/or guar based gels and for stabilizing xanthan based gels. One such salt, tetrakis (hydroxymethyl) phosphonium sulfate (THPS) has been used historically as an excellent biocide with benign environmental profile in the oil field industry and as a flame retardant in the textile industry.

In embodiments of the invention, a diutan and/or guar-based gel fluid viscosity can be gradually reduced with time at a given temperature when the fluid contains THPS. The breaking occurs most noticeably at high temperatures (i.e. >93.3° C.) with increased rate observed with increasing breaker concentrations. Other structurally similar chemicals also act as breakers, for example, tetrakishydroxymethyl phosphonium chloride and other tetrakis(hydroxyalkyl) phosphonium sulfates and chlorides. Potential applications that benefit from these breakers include fracturing, coiled tubing cleanout, sand control, water control, acidizing, fluid loss control, lost circulation and cementing.

In other embodiments of the invention, xanthan fluid viscosity may be stabilized over higher temperatures such as those temperatures at which xanthan is normally unstable.

Generally, some embodiments may include forming a fluid comprising a tetrakis(hydroxyalkyl) phosphonium salt and a polymer; and exposing the fluid to a temperature of about 20° C. to about 200° C.; wherein a viscosity is observed that is at least about 5 percent different than if no salt were present. In some embodiments, the exposing the fluid to a temperature occurs for at least about 5 minutes. In some embodiments, the observed viscosity is about 20 cP to about 200 cP. 9. In some embodiments, the viscosity is tailored by increasing the concentration of salt, for example, wherein the concentration of salt in the fluid is about 0.001 weight percent to about 10.00 weight percent. Some embodiments may use a fluid that comprises dipropylene glycol methyl ether or ethylene glycol monobutyl ether or a combination thereof. In some embodiments, the fluid further comprises a clay stabilizer.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

All diutan fluids were prepared by adding the diutan gum slurry to the water containing 2 weight percent KCl and mixed on a Warring blender for 30 min. The slurry contained diutan gum (37.9 weight percent), carrying solvent 2-butoxyethanol (60.3 weight percent), and suspension package hydroxypropyl cellulose (0.1 weight percent), hydroxypropyl guar (0.7 weight percent), and alkyl quaternary ammonium bentonite (1.0 weight percent). When THPS was introduced to a system, it was added after diutan was fully hydrated. THPS used in this study was 50 weight percent active with the remainder being non-crystalline silica (50 weight percent). Fluid viscosities were measured as a function of time and temperature on Chandler viscometers. A standard viscosity observation procedure was applied, wherein the viscosity was measured at a shear rate of 100 $s^{-1}$ with ramps down to 75 $s^{-1}$, 50 $s^{-1}$ and 25 $s^{-1}$ every 30 minutes.

Figure 2:
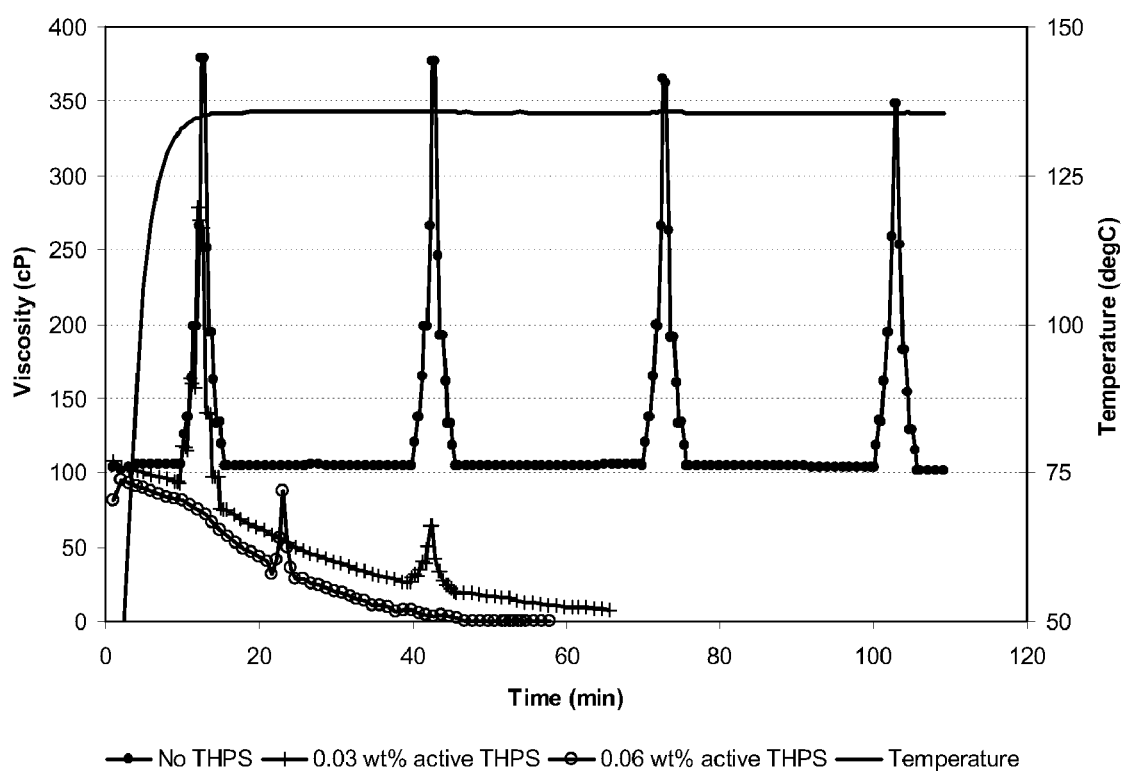
FIG. 2 is a plot of viscosity as a function of time at 135° C. for fluids containing 0.48 weight percent diutan gum, 2 weight percent KCl and various amounts of THPS.

FIGS. 1 and 2 plot the viscosity as a function of time at 121° C. and 135° C., respectively. The results clearly demonstrate viscosity reduction in the presence of THPS, and the breaking rate can be controlled with the THPS concentration. Therefore, THPS can be used as a multi-functional agent, not only as a biocide but also as a breaker. It is important to note that little fluid degradation occurs prior to heating, where initial viscosities are essentially the same with or without THPS at room temperature.

Figure 3:
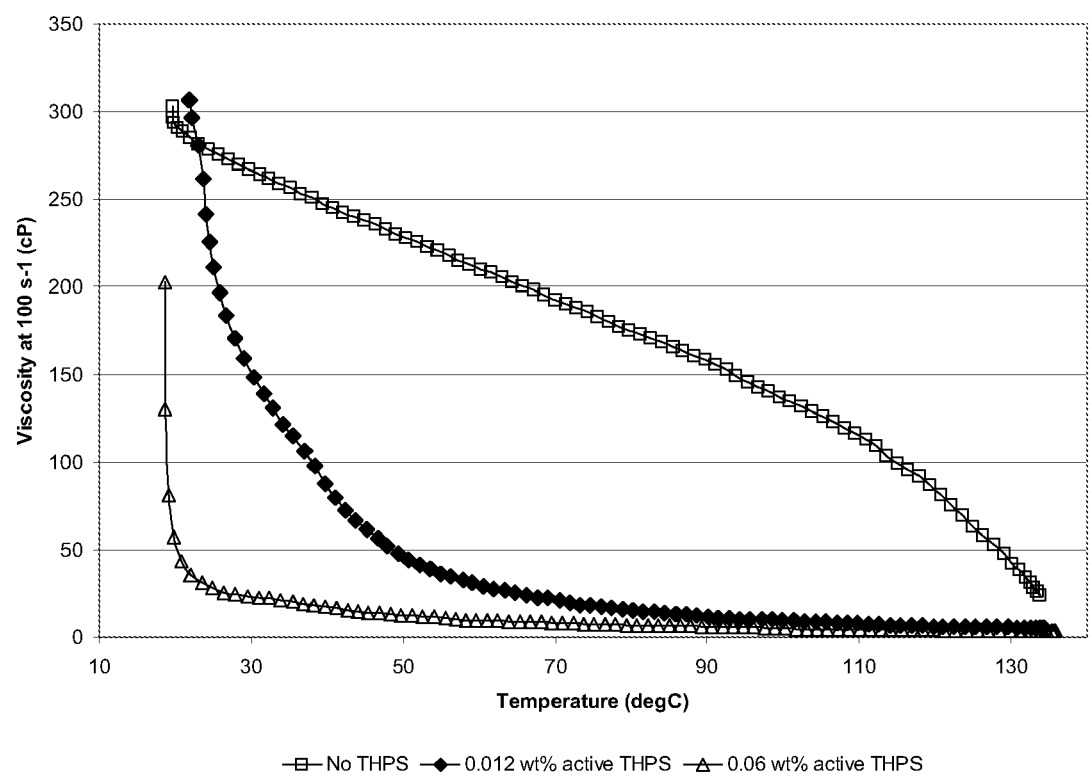
FIG. 3 is a plot of viscosity as a function of temperature for fluids containing 0.72 weight percent guar gum, 2 weight percent KCl and various amounts of THPS.

THPS was also investigated as a potential breaker for guar fluids. FIG. 3 illustrates the effect of THPS on the viscosity of 0.72 weight percent guar linear gel. As expected, the base fluid shows reduction of viscosity as temperature is gradually increased from 20 to 135° C. due to thermal degradation of the polymer known for such formulated guar fluids. But in the presence of THPS, even at concentration of as low as 0.012 weight percent, there is pronounced further viscosity reduction in comparison to the base fluid. This indicates that THPS can be used as a breaker for guar fluids as well.

Figure 4:
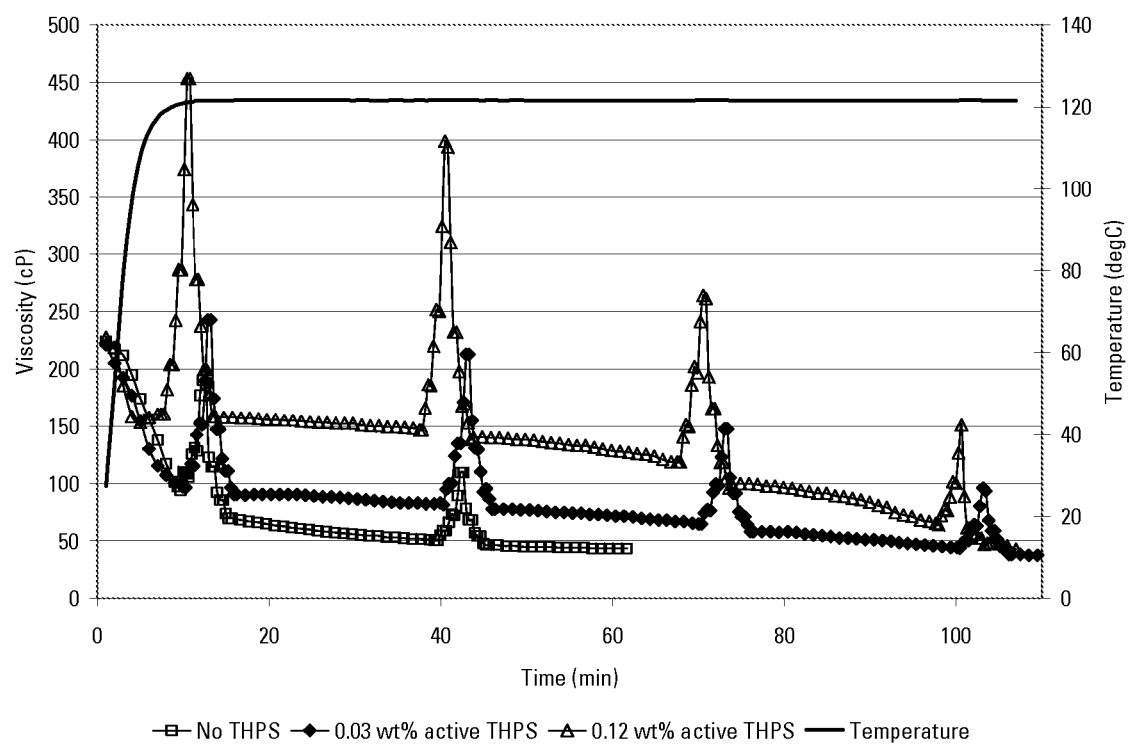
FIG. 4 is a plot of viscosity at 121° C. for the 0.72% xanthan base fluid with 2% KCl, 0.72% xanthan fluid with 2% KCl and 0.03% THPS, and 0.72% xanthan fluid with 2% KCl and 0.12% THPS, respectively.

For xanthan fluids, THPS was found to act as a stabilizer rather than as a breaker. A fluid was prepared which contained 0.72% xanthan and 0.95% dipropylene glycol methyl ether that was added to the DI water with 2 percent KCl, and allowed full hydration (identified as the base fluid in FIG. 4.). Dipropylene glycol methyl ether was the carrying solvent of the xanthan slurry. The viscosity of the fluid was measured with a Fann50-type viscometer at 121° C. following the API RP 39 schedule. The result is shown in FIG. 4. The viscosity gradually dropped from above 200 cP in the beginning to below 50 cP at 1 hour, possibly due to thermal degradation of the xanthan polymer at such elevated temperatures. THPS with a concentration of 0.03% was mixed into the base fluid, and its viscosity was similarly measured. The viscosity right before the $2^{nd}$ ramp (at about 40 minutes) increased by about 66% compared with the base fluid (FIG. 4). When 0.12% THPS was added to the base fluid, the viscosity right before the $2^{nd}$ ramp was about 2.9 times that of the base fluid (FIG. 4).

Figure 5:
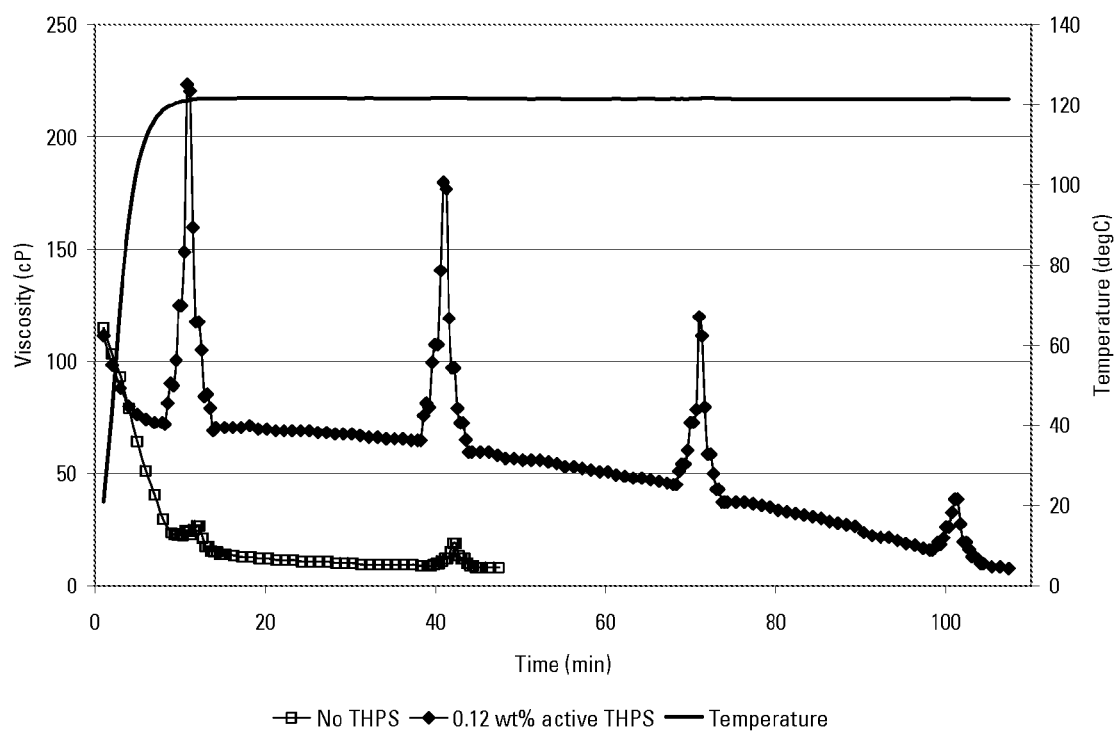
FIG. 5 is a plot of viscosity at 121° C. for the 0.48% xanthan base fluid with 2% KCl, and 0.48% xanthan fluid with 2% KCl and 0.12% THPS, respectively.

Xanthan slurry containing 0.48% xanthan and 0.64% dipropylene glycol methyl ether was added to the DI water with 2 percent KCl, and allowed full hydration (identified as the base fluid in FIG. 5). The viscosity of the fluid was measured with a Fann50-type viscometer at 121° C. following the API RP 39 schedule. The result is shown in FIG. 5. The viscosity gradually dropped from above 100 cP in the beginning to below 10 cP right before the $2^{nd}$ ramp, again, as a result of thermal degradation of the polymer. 0.12% THPS was mixed into the base fluid, and its viscosity was similarly measured. The viscosity right before the $2^{nd}$ ramp (at about 40 minutes) was about 7 times that of the base fluid (FIG. 5).

Figure 6:
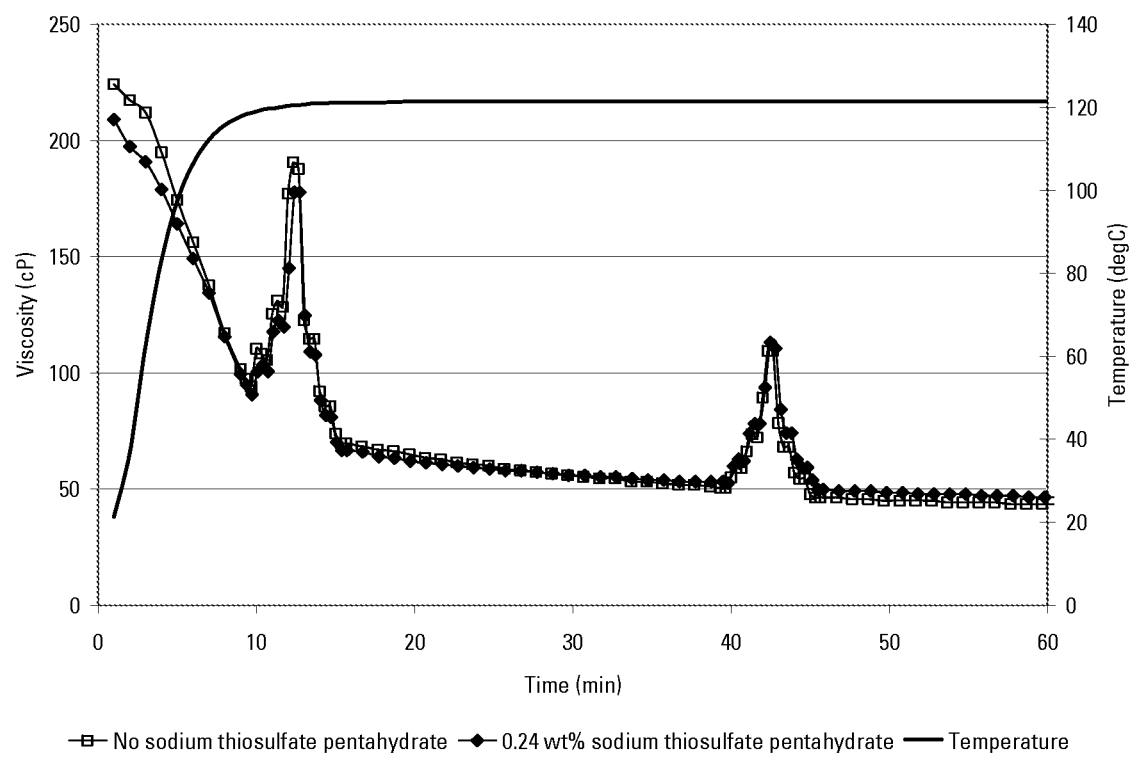
FIG. 6 is a plot of viscosity at 121° C. for the 0.72% xanthan fluid with 2% KCl and 0.24% sodium thiosulfate pentahydrate, and 0.72% xanthan base fluid with 2% KCl, respectively.

Sodium thiosulfate pentahydrate, a common high-temperature stabilizer, was tested and compared with THPS. Xanthan slurry containing 0.72% xanthan was similarly added to the DI water with 2 percent KCl, and allowed full hydration (identified as the base fluid in FIG. 6). 0.24% sodium thiosulfate pentahydrate was mixed into the base fluid, and the viscosity of the solution was similarly measured with a Fann50-type viscometer at 121° C., shown in FIG. 6. The viscosity curve was almost overlapped with that of the base fluid, suggesting that 0.24% sodium thiosulfate pentahydrate did not enhance the xanthan viscosity at 121° C.

THPS was effective in the presence of a carrying solvent (dipropylene glycol methyl ether or ethylene glycol monobutyl ether or a combination thereof) in the slurry xanthan package. That is, in some embodiments, the use xanthan in the slurry form may be desirable.

At lower temperature, such as 107° C. or less, THPS did not result in apparent viscosity enhancement of the xanthan fluid tested. The base fluid already had a decent viscosity (about 170 cP at 107° C.). The turning point (damage point) for xanthan in light brine (for example, 2% KCl) is about 121° C. For example, 0.12% THPS enhanced the 0.72% xanthan fluid at temperatures from about 110° C. to about 130° C. The temperature range where the THPS-induced viscosity enhancement occurred depended on a number of factors including xanthan concentration, salt type and concentration, THPS concentration, etc.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for tailoring the rheology of a fluid for use in the oil field services industry, comprising:
   forming a fluid comprising a tetrakis(hydroxyalkyl) phosphonium salt and a polymer, wherein the concentration of salt in the fluid is about 0.001 weight percent to about 10.00 weight percent; and
   exposing the fluid to a temperature of about 20° C. to about 200° C.;
   wherein a viscosity is observed that is at least about 5 percent different than if no salt were present.

2. The method of claim 1, wherein the polymer is diutan and/or derivatives of diutan and/or combinations thereof and the observed viscosity is reduced.

3. The method of claim 2, wherein the viscosity reduction is tailored by increasing the concentration of salt.

4. The method of claim 1, wherein the polymer is guar and/or derivatives of guar and/or combinations thereof and the observed viscosity is reduced.

5. The method of claim 4, wherein the viscosity reduction is tailored by increasing the concentration of salt.

6. The method of claim 1, wherein the polymer is xanthan and/or derivatives of xanthan and/or combinations thereof and the observed viscosity is increased.

7. The method of claim 6, wherein the viscosity increase is tailored by increasing the concentration of salt.

8. The method of claim 6, wherein the fluid further comprises dipropylene glycol methyl ether or ethylene glycol monobutyl ether or a combination thereof.

9. The method of claim 1, wherein the exposing the fluid to a temperature occurs for at least about 5 minutes.

10. The method of claim 1, wherein the observed viscosity is about 20 cP to about 200 cP.

11. The method of claim 1, wherein the tetrakis(hydroxyalkyl) phosphonium salt is tetrakis(hydroxymethyl) phosphonium sulfate, tetrakishydroxymethyl phosphonium chloride, or a combination thereof.

12. The method of claim 1, wherein the polymer is diutan, guar, xantham, derivatives thereof, and/or combinations thereof.

13. The method of claim 1, wherein the fluid further comprises a clay stabilizer.

14. A method for tailoring the rheology of a fluid for use in the oil field services industry, comprising:
    forming a fluid comprising a tetrakis(hydroxyalkyl) phosphonium salt and diutan and/or guar and/or guar derivatives and/or a combination thereof, wherein the concentration of salt in the fluid is about 0.001 weight percent to about 10.00 weight percent; and
    exposing the fluid to a temperature of about 20° C. to about 200° C.;
    wherein a viscosity is observed that is at least about 5 percent lower than if no salt were present.

15. The method of claim 14, wherein the viscosity reduction is tailored by increasing the concentration of salt.

16. The method of claim 14, wherein the observed viscosity is about 20 cP to about 200 cP.

17. The method of claim 14, wherein the tetrakis(hydroxyalkyl) phosphonium salt is tetrakis(hydroxymethyl) phosphonium sulfate, tetrakishydroxymethyl phosphonium chloride, or a combination thereof.

18. A method for tailoring the rheology of a fluid for use in the oil field services industry, comprising:
    forming a fluid comprising a tetrakis(hydroxyalkyl) phosphonium salt and xanthan, wherein the concentration of salt in the fluid is about 0.001 eight percent to about 10.00 weight percent and
    exposing the fluid to a temperature of about 20° C. to about 200° C.;
    wherein a viscosity is observed that is at least about 5 percent higher than if no salt were present.

19. The method of claim 18, wherein the observed viscosity is about 20 cP to about 200 cP.

20. The method of claim 18, wherein the tetrakis(hydroxyalkyl) phosphonium salt is tetrakis(hydroxymethyl) phosphonium sulfate, tetrakishydroxymethyl phosphonium chloride, or a combination thereof.

21. The method of claim 18, wherein the fluid further comprises dipropylene glycol methyl ether or ethylene glycol monobutyl ether or a combination thereof.

22. The method of claim 18, wherein the fluid further comprises a clay stabilizer.

* * * * *